United States Patent
Inokawa

(10) Patent No.: US 8,901,226 B2
(45) Date of Patent: Dec. 2, 2014

(54) PHENOL RESIN BASED MOLDING MATERIAL

(71) Applicant: Sumitomo Bakelite Co., Ltd., Tokyo (JP)

(72) Inventor: Daisuke Inokawa, Tokyo (JP)

(73) Assignee: Sumitomo Bakelite Co., Ltd., Tokyo (JP)

( * ) Notice: Subject to any disclaimer, the term of this patent is extended or adjusted under 35 U.S.C. 154(b) by 0 days.

(21) Appl. No.: 13/849,404

(22) Filed: Mar. 22, 2013

(65) Prior Publication Data

US 2013/0281600 A1 Oct. 24, 2013

Related U.S. Application Data

(63) Continuation of application No. PCT/JP2011/071556, filed on Sep. 22, 2011.

(30) Foreign Application Priority Data

Sep. 24, 2010 (JP) .................................. 2010-213632

(51) Int. Cl.
C08K 3/34 (2006.01)
C08L 61/06 (2006.01)
B01J 20/28 (2006.01)
B01J 20/30 (2006.01)
C08L 23/10 (2006.01)
C08L 23/04 (2006.01)

(52) U.S. Cl.
CPC ............ B01J 20/28078 (2013.01); C08L 23/10 (2013.01); C08L 23/04 (2013.01); B01J 20/30 (2013.01); B01J 20/3085 (2013.01); C08L 61/06 (2013.01)
USPC .......................................... 524/451; 524/509

(58) Field of Classification Search
USPC .................................................. 524/451, 509
See application file for complete search history.

(56) References Cited

FOREIGN PATENT DOCUMENTS

| JP | 06-093169 A | | 4/1994 |
|---|---|---|---|
| JP | 09-176447 A | | 7/1997 |
| JP | 10-120867 A | | 5/1998 |
| JP | 10-120871 A | | 5/1998 |
| JP | 10-306197 A | | 11/1998 |
| JP | 11-080301 A | | 3/1999 |
| JP | 11080301 A | * | 3/1999 |
| JP | 2001261928 A | * | 9/2001 |
| JP | 2004282923 A | * | 10/2004 |
| JP | 2006-096778 A | | 4/2006 |
| JP | 2006096778 A | * | 4/2006 |
| JP | 2006-225540 A | | 8/2006 |

OTHER PUBLICATIONS

Machine translation for JP 11-080301 A, Mar. 26, 1999.*
Machine translation of JP 2001-261928 A, Sep. 26, 2001.*

* cited by examiner

*Primary Examiner* — Vickey Nerangis
(74) *Attorney, Agent, or Firm* — Westerman, Hattori, Daniels & Adrian, LLP

(57) ABSTRACT

A phenolic resin molding compound, which is thermally stable in a heating cylinder, is provided. By using the phenolic resin molding compound, moldings with an excellent dimensional precision can be obtained. The phenolic resin molding compound comprises: (A) a novolac phenolic resin with an o/p ratio (ortho/para ratio) of 0.7 to 0.9; (B) a novolac phenolic resin with an o/p ratio of 1.1 to 1.3; (C) talc; and (D) a polyethylene or polyethylene/polypropylene copolymer. The amount of (D) the polyethylene or polyethylene/polypropylene copolymer relative to a total weight of the phenolic resin molding compound is 0.5 to 1.5 weight %. It is preferable that the total amount of (A) and (B) is 20 to 40 weight %, and the amount of (C) is 5 to 15 weight %.

6 Claims, No Drawings

PHENOL RESIN BASED MOLDING MATERIAL

TECHNICAL FIELD

The present invention relates to a phenolic resin molding compound.

Priority is claimed on Japanese Patent Application No. 2010-213632, filed Sep. 24, 2010, the content of which is incorporated herein by reference.

BACKGROUND ART

The phenolic resin molding compound is a material having an excellent balance of heat resistance, electrical properties, mechanical properties, dimensional stability, and the like. Therefore, they are utilized in a varieties of fields including electrical components. Generally, they are molded by injection molding. The phenolic resin molding compound loses its flowability when it is in the melted status, in which the phenolic resin molding compound is plasticized at 90° C. to 120° C. in the cylinder of the injection molding machine, since its viscosity increases due to the progress of the curing reaction of the resin. Thus, the thermal stability of the melted resin is reduced. Since the low stability of the melted molding compounds in the cylinder of the injection molding machine, the applicable condition is narrowly limited in a case where moldings are formed with an injection molding machine using the conventional phenolic resin molding compounds.

The viscosity of the generally used phenolic resin molding compounds are relatively high even in a state where they are plasticized at 90° C. to 120° C. in the cylinder. And, the viscosity increases further rapidly during its curing in the injection process where the phenolic resin molding compound is injected into the mold at 160° C. to 200° C. in order to cure it. Thus, the time span, in which the phenolic resin molding compound retains its flowability, is short. Therefore, in order to obtain high quality moldings, it is required to inject the material into the mold in a very short period of time at a very high pressure. However, a residual stress is generated in the moldings formed in the mold in this case. This leads to warp and deformation of the moldings when it is taken out from the mold and the stress is diffused during cooling process. In addition, it is very difficult to avoid burr formation, since a clearance is easily formed between molds when the resin is injected into the mold at a high pressure.

Conventionally, in order to solve the above-mentioned problem, molding is performed by reducing the melt viscosity of the molding compound to increase its flowability and injecting the molding compound at a low pressure. In this approach, the burr formation can be suppressed. However, this approach is difficult to apply to the practical usage since the molding cycle become longer due to slow curing.

On the other hand, in the injection molding using the phenolic resin molding compound, a reduced production yield problem occurs since dimension of the moldings can be easily varied and the dimension does not fit into the tolerance range. To compensate that, a precision processing is performed afterward. However, improving the production yield and reducing the post-injection precision processing are needed in order to reduce the production cost.

A technique to improve the thermal stability of the phenolic resin molding compound in the cylinder is disclosed in Patent Literature (PTL) 1. However, further improvement is needed in order to improve the dimensional precision.

On the other hand, a technique to improve the dimensional precision of the injected moldings by adding the talc or clay to the phenolic resin molding compound is disclosed in PTL2. However, further improvement is needed in order to improve its thermal stability in the cylinder.

RELATED ART DOCUMENT

Patent Literature

PTL 1: Japanese Unexamined Patent Application, First Publication No. 1997-176477
PTL 2: Japanese Unexamined Patent Application, First Publication No. 2006-96778

DISCLOSURE OF INVENTION

Problems to be Solved by the Invention

A phenolic resin molding compound provided in the present invention, has thermal stability in a heating cylinder and can be used to obtain the moldings with excellent dimensional precision.

Means for Solving the Problems

An aspect of the present invention is a phenolic resin molding compound including: (A) a novolac phenolic resin with an o/p ratio (ortho/para ratio) of 0.7 to 0.9; (B) a novolac phenolic resin with an o/p ratio of 1.1 to 1.3; (C) talc; and (D) a polyethylene or polyethylene/polypropylene copolymer, wherein an amount of (D) the polyethylene or polyethylene/polypropylene copolymer relative to a total weight of the phenolic resin molding compound is 0.5 to 1.5 weight %.

In the aspect of the present invention, a total amount of (A) and (B) relative to the total amount of the phenolic resin molding compound maybe 20 to 40 weight %, and an amount of (C) relative to the total amount of the phenolic resin molding compound maybe 5 to 15 weight %.

Effects of the Invention

The phenolic resin molding compound, which is an aspect of the present invention, has an excellent moldability since it has a superior thermal stability in the cylinder compared to the conventional ones and is cured rapidly in the mold. In addition, moldings with an excellent dimensional precision can be obtained.

BEST MODE FOR CARRYING OUT THE INVENTION

The phenolic resin molding compound, which is an aspect of the present invention, is explained below (hereinafter, referred as "molding compound of the present invention").

The molding compound of the present invention is a phenolic resin molding compound including: (A) a novolac phenolic resin with an o/p ratio (ortho/para ratio) of 0.7 to 0.9; (B) a novolac phenolic resin with an o/p ratio of 1.1 to 1.3; (C) talc; and (D) a polyethylene or polyethylene/polypropylene copolymer, wherein an amount of (D) the polyethylene or polyethylene/polypropylene copolymer relative to a total weight of the phenolic resin molding compound is 0.5 to 1.5 weight %.

The above-mentioned o/p ratio is a value computed by assigning the amount of bound methylene group obtained by $^{13}$C-NMR spectroscopy in the equation indicated below.

$$o/p\ ratio=(X+Y/2)/(Y/2+Z)$$

X: Number of methylene groups binding at ortho-ortho positions in phenol nuclei

Y: Number of methylene groups binding at ortho-para positions in phenol nuclei

Z: Number of methylene groups binding at para-para positions in phenol nuclei

First, a novolac phenolic resins used for the phenolic resin molding compound of the present invention are explained.

The novolac phenolic resins can be obtained by reacting phenols and aldehydes in the presence of an acidic catalyst. Hardening characteristic of these novolac phenolic resins varies based on the ratio of the binding positions of methylene groups or substituted methylene groups originated from the aldehydes on the phenolic hydroxyl groups of the phenols.

Both (A) a novolac phenolic resin with an o/p ratio of 0.7 to 0.9 and (B) a novolac phenolic resin with an o/p ratio of 1.1 to 1.3 are used together as the novolac phenolic resins in the phenolic resin molding compound of the present invention.

It is preferable the weight ratio between the novolac phenolic resin (A) and the novolac phenolic resin (B), which is (B)/(A), is in the range of 0.5 to 1 in the phenolic resin molding compound of the present invention.

By setting the amount of the novolac phenolic resin (B) to be the lower limit value or higher, the curability in the mold can be fastened, shortening the molding cycle. By setting it to the higher limit value or lower, the thermal stability in the heated cylinder can be kept at a high level, improving the continuous moldability.

The phenolic resin molding compound of the present invention includes (C) talc. Talk is an inorganic filling material in a flat shape, and has a low shrinkage capacity. Therefore, the dimensional precision of the moldings can be improved by adding the talc.

The amount of talc to the total amount of the molding compound is 5 to 15 weight %. Preferably, it is 7 to 12 weight %. By setting the amount of (C) talc to be the lower limit value or higher, the dimensional precision of the moldings are kept in a suitable level. By setting the amount to be the higher limit or lower, the mechanical strength of the moldings are kept in a suitable level.

In addition to (C) talc, other inorganic filling materials can be added to the phenolic resin molding compound. The inorganic filling materials are not particularly limited. For example, glass fibers, clay, silica, calcium carbonate, mica, rock wools, aluminum hydroxide, or the like can be used.

The phenolic resin molding compound of the present invention includes (D) the polyethylene or polyethylene/polypropylene copolymer. The polyethylene or polyethylene/polypropylene copolymer used here is not particularly limited. However, it is preferable that the average molecular weight of the polyethylene or polyethylene/polypropylene copolymer to be 500 to 8000. If the average molecular weight is less than 500, the molecular weight is too low, and could lead to inadequate appearance or eluting out as impurities. If it is more than 8000, its dispersibility is deteriorated, causing lower mechanical strength or inconsistency in the moldings. These could be a factor of defects in the moldings.

The amount of (D) the polyethylene or polyethylene/polypropylene copolymer to the total amount of the molding compound is 0.5 to 1.5 weight %. Preferably, it is 0.7 to 1.2 weight %. By setting the amount of (D) the polyethylene or polyethylene/polypropylene copolymer to be the lower limit value or higher, the thermal stability of the phenolic resin molding compound in the heated cylinder can be kept in a suitable level. By setting the amount to be the higher limit or lower, the workability in the production can be kept in a suitable level, and the reduced mechanical strength and the inadequate appearance defect can be prevented.

If it is needed, various additives used for the conventional thermosetting resin molding compounds, such as curing agents and curing catalysts, can be added to the phenolic resin molding compound of the present invention. Also, mold release agents, such as stearate and zinc stearate, can be added. Also, adhesion accelerators for improving adhesiveness of the filling materials and the thermosetting resin molding compounds can be added. Also, coupling agents, colored pigments, colored dyes, solvents, or the like can be added.

The molding compound of the present invention can be produced by conventional methods. For example, it can be obtained by following processes. The above-described components are evenly mixed, in the presence of the filling material, the curing agent, the curing catalyst, the mold release agent, the pigment, the coupling agent, or the like is it is needed. Then, the mixed material is heat-melt kneaded with a single kneading apparatus, such as a roll, a ko-kneader, a twin-screw extruder, or the like, or a combination of multiple kneading apparatuses, in which the roll and other kneading apparatus are combined. Then, the kneaded material is pelletized and pulverized.

The molding compound of the present invention is suitable for the injection molding. However, the molding method is not particularly limited to the injection molding. For example, the molding compound of the present invention can be applicable to other molding methods, such as the transfer molding, the compression molding, the injection compression molding, or the like.

The molding condition is not particularly limited for the molding compound of the present invention. However, the molding can be performed under a condition where the mold temperature is 170 to 190° C., molding pressure is 100 to 150 MPa, and curing time is 30 to 90 seconds, if an injection moulder is used for example.

Example

The phenolic resin molding compound of the present invention is explained by using Example of the present invention and Comparative Example below.

Row material mixtures having the components in a ratio (weight %) shown in Table 1 were kneaded with heating kneading rolls having different rotation speeds. The kneaded mixtures were cooled into a sheet shape. Then, they were crushed and pulverized to obtain granular molding compounds. The workability during producing the molding compounds and property evaluation results of the produced moldings obtained by molding the molding compounds are shown in Table 1.

The heat kneading was performed in the condition where the rotation speeds in the fast side and the slow side were 25 rpm and 17 rpm, respectively, the temperature in the fast side and the slow side were 90° C. and 20° C., respectively, and kneading time was 5 to 10 minutes.

TABLE 1

| | | Example 1 | Example 2 | Example 3 | Example 4 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|
| Composition (weight %) | Novolac phenolic resin (A) o/p ratio: 0.8 | 20 | 20 | 20 | 15 | 30 | 0 | 21 | 19 | 20 | 19 | 20 |
| | Novolic phenolic resin (B) o/p ratio: 1.1 | 10 | 10 | 10 | 15 | 0 | 30 | 10 | 10 | 10 | 10 | 10 |
| | Hexamethylenetetramine | 5.3 | 5.3 | 5.3 | 5.3 | 5.3 | 5.3 | 5.3 | 5.3 | 5.3 | 5.3 | 5.3 |
| | Glass fiber | 43 | 43 | 43 | 43 | 43 | 43 | 43 | 43 | 43 | 43 | 43 |
| | Talc | 9 | 9 | 9 | 9 | 9 | 9 | 9 | 9 | 0 | 9 | 0 |
| | Clay | 9 | 9 | 9 | 9 | 9 | 9 | 9 | 9 | 18 | 9 | 18 |
| | Curing accelerating agent | 1.2 | 1.2 | 1.2 | 1.2 | 1.2 | 1.2 | 1.2 | 1.2 | 1.2 | 1.2 | 1.2 |
| | Colorant | 1.0 | 1.0 | 1.0 | 1.0 | 1.0 | 1.0 | 1.0 | 1.0 | 1.0 | 1.0 | 1.0 |
| | Polyethylene | 0.8 | | 0.5 | 0.8 | 0.8 | 0.8 | 0.0 | 2.0 | 0.8 | | |
| | Polyethylene/polypropylene copolymer | | 0.8 | | | | | | | | 2.0 | 0.8 |
| | Mold release agent | 0.7 | 0.7 | 0.7 | 0.7 | 0.7 | 0.7 | 0.7 | 0.7 | 0.7 | 0.7 | 0.7 |
| Character | Compressive strength (MPa) | 220 | 225 | 230 | 215 | 210 | 225 | 220 | 180 | 290 | 185 | 290 |
| | Dimensional precision 8σ (μm) | 20 | 20 | 18 | 15 | 34 | 14 | 17 | 33 | 46 | 35 | 45 |
| | Cure rate (gm/sec) | 75 | 80 | 75 | 80 | 45 | 85 | 70 | 60 | 70 | 65 | 70 |
| | Thermal stability (min) | 10 | 8 | 7 | 6 | 12 | 3 | 4 | 12 | 10 | 10 | 8 |
| | Workability | Good | Good | Good | Good | Good | Bad | Good | Bad | Good | Bad | Good |

Each component used for Examples of the present invention and Comparative Examples are shown below.

(1) Novolac phenolic resin A: "A-1082G" manufactured by SUMITOMO BAKELITE COMPANY LIMITED, o/p ratio=0.8

(2) Novolac phenolic resin B: "29834K" manufactured by SUMITOMO BAKELITE COMPANY LIMITED, o/p ratio=1.1

(3) Hexamethylenetetramine: "HEXAMINE" manufactured by CHANG PETROCHEMICAL. CO. LTD.

(4) Glass fiber: "CS3E479S" manufactured by NITTO BOSEKI CO. LTD.

(5) Talc: "Talc DS-34" manufactured by FUJI TALC INDUSTRIAL CO. LTD.

(6) Clay: "SP33" manufactured by FREEPORT KAORIN INC.

(7) Curing accelerating agent (Magnesium oxide): "KYOWAMAG 30" manufactured by KYOWA CHEMICAL INDUSTRY CO. LTD.

(8) Polyethylene: "POLYLETS OX-18P" manufactured by CHUSEI OIL CO. LTD.

(9) Polyethylene/polypropylene copolymer: "HIGHWAX 4202E" manufactured by MITSUI CHEMICALS INC.

(10) Mold release agent (stearate): "STEARATE SAKURA" manufactured by NOF CORPORATION

(11) Colorant (Carbon Black): "CARBON BLACK #750B" manufactured by MITSUBISHI CHEMICAL CORPORATION The molding methods of the test pieces and the evaluation methods used in the evaluation of properties is explained below.

(1) Compressive strength: Test pieces were produced by the transfer molding (mold temperature: 175° C., curing time: 3 minutes), and evaluated in accordance with the JIS K 6911 standard.

(2) Dimensional precision: Test pieces in a cylindrical shape, which had an outer diameter of 40 mm, an inner diameter of 34 mm, and thickness of 3 mm, were produced by injection molding (mold temperature: 175° C., curing time: 25 seconds). Then, the inner diameters were measured (n=18), and the standard deviation G was obtained.

(3) Cure rate: Time needed for 10 to 90% of curing against the maximum load was measured with the CURELASTOMETER (manufactured by JSR CORPORATION)

(4) Thermal stability: First, test pieces having volume of 90 mm$^3$ were molded by 10 shots continuous molding (cylinder temperature: 90° C., mold temperature: 175"C, the next moldings were done in the same molding condition as one shown above) with an injection molding machine (100 Ton, screw diameter ϕ: 40 mm) manufactured by TOSHIBA MACHINE CO. LTD. Then, a phenolic resin molding compound was allowed to be stand in the state of being weighted in a heating cylinder. After some time was elapsed, injection was performed. Then, the longest standing time, which allows the melted material to be fluidized and to be sufficiently injected into the mold, was obtained when molding was performed in varied standing times.

(5) Workability: Workability during material production was confirmed.

Good: The workability was excellent
Bad: It was difficult to roll-knead the material Table 1 shows that Examples 1 to 4 are the molding compounds of the present invention, and they showed excellent compressive strength, dimensional precision, cure rate, thermal stability, and workability.

In the molding compound of Comparative Example 1, the novolac phenolic resin with o/p ratio of 1.1 to 1.3 was not included. Therefore, cure rate was slow, and the dimensional precision of the moldings was deteriorated since curing in the mold was slow.

In the molding compound of Comparative Example 2, the novolac phenolic resin with o/p ratio of 0.7 to 0.9 was not included. Therefore, its thermal stability was reduced because of too fast curing. Also, workability was deteriorated.

In the molding compound of Comparative Example 3, the polyethylene or polyethylene/polypropylene copolymer was not included. Therefore, generation of friction heat against the screw was not suppressed, and its thermal stability was reduced.

In the molding compounds of Comparative Examples 4 and 6, the amounts of the polyethylene or polyethylene/polypropylene copolymer were too high. Therefore, compressive strength, dimensional precision, and workability were reduced.

In the molding compounds of Comparative Examples 5 and 7, the talc was not included. Therefore, dimensional precisions were reduced.

INDUSTRIAL APPLICABILITY

The phenolic resin molding compound of the present invention has the balanced thermal stability in the heated cylinder and curability in the mold at a high level. Also, moldings with an excellent dimensional precision can be obtained by using the molding compound of the present invention. Therefore, it is suitable to be used as a molding compound for producing the molded products in which above-mentioned characteristics are required. Such molded products includes auto parts (motor-related parts, such as varieties of motor gear cases, motor brush holders, varieties of bushes, or the like), varieties of gear parts, hydraulic bulb parts, or the like.

The invention claimed is:

1. A phenolic resin molding compound comprising:
   (A) a novolac phenolic resin with an o/p ratio (ortho/para ratio) of 0.7 to 0.9;
   (B) a novolac phenolic resin with an o/p ratio of 1.1 to 1.3;
   (C) talc; and
   (D) a polyethylene or polyethylene/polypropylene copolymer,
   wherein
   a total amount of (A) and (B) relative to the total amount of the phenolic resin molding compound is 20 to 40 weight %,
   an amount of (C) relative to the total amount of the phenolic resin molding compound is 5 to 15 weight %,
   an amount of (D) the polyethylene or polyethylene/polypropylene copolymer relative to a total weight of the phenolic resin molding compound is 0.5 to 1.5 weight %, and
   a weight ratio between (A) and (B), which is (B)/(A), is in the range of 0.5 to 1,
   wherein workability during material production of the phenolic resin molding compound is good,
   wherein a molded product from the phenolic resin molding compound has a dimensional precision of 15 to 20 μm, and a thermal stability of 6 to 10 min.

2. The phenolic resin molding compound according to claim 1, wherein the amount of (C) relative to the total amount of the phenolic resin molding compound is 7 to 12 weight %.

3. The phenolic resin molding compound according to claim 1, wherein the amount of (D) the polyethylene or polyethylene/polypropylene copolymer relative to a total weight of the phenolic resin molding compound is 0.7 to 1.2 weight %.

4. The phenolic resin molding compound according to claim 2, wherein the total amount of (A) and (B) relative to the total amount of the phenolic resin molding compound is 30 to 40 weight %.

5. The phenolic resin molding compound according to claim 1, further comprising an inorganic filler other than the talc.

6. The phenolic resin molding compound according to claim 5, wherein the inorganic filler other than the talc is selected from the group consisting of glass fibers, clay, silica, calcium carbonate, mica, rock wools, and aluminum hydroxide.

* * * * *